3,354,241
DIPHOSPHITES
Millard S. Larrison, Livingston, N.J., assignor, by mesne assignments, to Union Carbide Corporation, a corporation of New York
No Drawing. Filed Mar. 1, 1965, Ser. No. 436,349
12 Claims. (Cl. 260—929)

ABSTRACT OF THE DISCLOSURE

Diphosphites having the formula

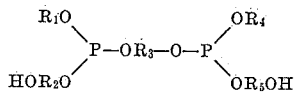

where $R_1$ and $R_4$ are selected from the group consisting of alkyl, carbocyclic aryl and carbocyclic haloaryl and $R_2$, $R_3$ and $R_5$ are selected from the group consisting of alkylene, alkyleneoxyalkylene and alkylene poly (oxyalkylene) are prepared by reacting 2 mols of a trihydrocarbon phosphite or trihaloaryl phosphite with 3 mols of the appropriate diol and stripping out 4 mols of monohydric phenol or alcohol. The compounds are useful in stabilizing polyurethanes and in taking part in the urethane forming reaction.

---

This invention relates to the preparation of novel phosphites and their use as stabilizers.

It is an object of the present invention to prepare novel phosphites.

Another object is to improve the color stability of polyurethanes.

A mere specific object is to improve the color stability of flexible polyurethane foams.

A further object is to incorporate a reactive stabilizer in a polyurethane forming composition.

Still further objects and the entire scope of applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having the following formula

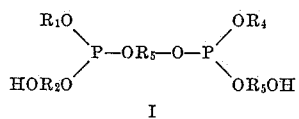

I where $R_1$ and $R_4$ are selected from the group consisting of alkyl, carbocyclic aryl and carbocyclic haloaryl and $R_2$, $R_3$ and $R_5$ are alkylene, alkyleneoxyalkylene or alkylene-poly (oxyalkylene).

Preferably, $R_1$ and $R_4$ are aryl or haloaryl and $R_2$, $R_3$ and $R_5$ are the residues of a polyalkylene glycol, more preferably polypropylene glycol, and most preferably polypropylene glycol of molecular weight about 400 to 450.

The compounds of the present invention are conveniently prepared by reacting 2 mols of a triaryl phosphite, tri (haloaryl) phosphite of trialkyl phosphite with 3 moles of the appropriate diol and stripping out 4 moles of monohydric phenol or monohydric alcohol.

The reaction is preferably carried out in the presence of a catalyst.

Alkaline catalysts can be employed, preferably such alkaline catalysts have a pH of at least 11 in a 0.1 N solution. Examples of such catalysts are sodium phenate, sodium cresylate, sodium methylate, sodium decylate, sodium octadecylate, potassium phenate, sodium pentachlorophenate, sodium 2,4,6-trichlorophenate, sodium monochlorophenate, sodium pentabromophenate. The catalyst is employed in an amount of 0.1–5% of the reactants.

There can also be used as catalysts dihydrocarbyl or dihaloaryl phosphites, e.g., 0.1–5% of diphenyl phosphite, di-o-cresyl phosphite, di-p-cresyl phosphite, dimethyl phosphite, bis decyl phosphite, bis octadecyl phosphite, di-p-chlorophenyl phosphite, di-2,4,6-trichlorophenyl phosphite, di-pentachlorophenyl phosphite and di-2,4,6-tribromophenyl phosphite.

Unless otherwise indicated, all parts and percentages are by weight.

Examples of starting phosphite reactants are triphenyl phosphite, tri p-cresyl phosphite, tri-o-cresyl phosphite, tri m-cresyl phosphite, tri-xylenyl phosphite, tris (p-butylphenyl) phosphite, tris decyl phosphite, trimethyl phosphite, tris octadecyl phosphite, tris (2,4,6-trichlorophenyl) phosphite, tris (2,3,5-trichlorophenyl) phosphite, tri (o-chlorophenyl) phosphite, tri (p-chlorophenyl) phosphite, tri (m-chlorophenyl) phosphite, tris (2,4,6-tribromophenyl) phosphite, tri (naphthyl) phosphite, tris pentachlorophenyl phosphite, diphenyl decyl phosphite, phenyl didecyl phosphite, tris isooctyl phosphite, tris (2-ethylhexyl) phosphite, tris isodecyl phosphite, and tris n-octyl phosphite.

As the diol there can be employed tetramethylene glycol, decamethylene glycol, dipropylene glycol, tripropylene glycol, polypropylene glycol 425 (polypropylene glycol having an average molecular weight of 425), polypropylene glycol molecular weight 1025, polypropylene glycol molecular weight 2025, diethylene glycol, triethylene glycol, polyethylene glycol molecular weight 1000, polyethylene glycol molecular weight 2000, polyethylene glycol molecular weight 3000, di tetramethylene glycol, polytetramethylene glycol molecular weight 450, polyethylene glycol molecular weight 400, polytetramethylene glycol molecular weight 2300, polyethylene glycolpolypropylene glycol copolymer molecular weight 1900.

As stated, the preferred diols as reactants to form the diphosphites are polypropylene glycols of molecular weight 400–450. For flexible foams such materials are superior as reactants to dipropylene glycol. Tripropylene glycol, however, can be used as a reactant to give excellent flexible phosphorus containing polyurethane foams. The polypropylene glycols give diphosphite products which are more resistant to hydrolysis than the products from polyethylene glycols. One reason for this is that the polypropylene glycols as made commercially have over 65% secondary hydroxyl groups whereas the polyethylene glycols contain 100% primary hydroxyl groups.

The diphosphites of the present invention are useful as hydroxyl reactants which impart flame resistance to polyurethanes and polyesters. They also can be employed in an amount of 0.1–10%, e.g., 2%, to impart flame resistance to polyolefines, e.g., polyethylene, polypropylene, ethylene-propylene copolymer, vinyl polymers, e.g., polystyrene, polyvinyl acetate, polyacrylates and methacrylates, e.g., methyl methacrylate polymer and ethyl acrylate polymer, neoprene, natural rubber, butadiene-styrene copolymer, cis isoprene polymer, butyl rubber, etc. The diphosphites are also useful in amounts of 0.1–10%, e.g., 1%, as stabilizers for polyvinyl chloride and other vinyl chloride containing resins.

Their most important use at present appears to be as reactive color stabilizers in the preparation of flexible polyurethane foams, i.e., foams having a hydroxyl number of 35–75. When used to stabilize the color of flexible urethane foams they are preferably employed in an amount of 1–10% of the total polyurethane forming reactants although they can be employed in amounts as little as 0.5 or as much as 20% of the total polyurethane forming reactants. They are also useful in forming rigid and semirigid polyurethane foams and in forming rubbery and other unfoamed polyurethanes. As much as 100% of the total hydroxyl reactant in making such polyurethanes can be the diphosphite.

Unless otherwise indicated, all parts and percentages are by weight.

Diphosphite compounds within the present invention include diphenyl tris (polypropylene glycol 425) diphosphite, bis (2,4,6-trichlorophenyl) tris (polypropylene glycol 425) diphosphite, bis (pentachlorophenyl) (tris polypropylene glycol 425) diphosphite, bis (2,4,6-tribromophenyl) tris (polypropylene glycol 425) diphosphite, bis (pentabromophenyl) tris (polypropylene glycol 425) diphosphite, bis (o-chlorophenyl) tris (polypropylene glycol 425) diphosphite, bis (p-chlorophenyl) tris (polypropylene glycol 425) diphosphite, bis (m-chlorophenyl) bis (polypropylene glycol 425) diphosphite, bis (o-methylphenyl) tris (polypropylene glycol 425) diphosphite, bis (m-methylphenyl) tris (polypropylene glycol 425) diphosphite, bis (p-methylphenyl) tris (polypropylene glycol 425) diphosphite, bis (p-butylphenyl) tris (polypropylene glycol 425) diphosphite, bis ($\alpha$-naphthyl) tris (polypropylene glycol 425) diphosphite, bis (3,5-xylenyl) tris (polypropylene glycol 425) diphosphite, dimethyl tris (polypropylene glycol 425) diphosphite, bis (decyl) tris (polypropylene glycol 425) diphosphite, bis (isodecyl) tris (polypropylene glycol 425) diphosphite, bis (octadecyl) tris (polypropylene glycol 425) diphosphite, bis (n-octyl) tris (polypropylene glycol 425) diphosphite, bis (2-ethylhexyl) tris (polypropylene glycol 425) diphosphite, bis (isooctyl) tris (polypropylene glycol 425) diphosphite, mono phenyl mono decyl tris (polypropylene glycol 425) diphosphite, mono (2,4,6-trichlorophenyl) mono isooctyl tris (polypropylene glycol 425) diphosphite, diphenyl tris (tripropylene glycol) diphosphite, bis decyl tris (tripropylene glycol) diphosphite, bis (p-cresyl) tris (tripropylene glycol) diphosphite, bis (2,4,6-trichlorophenyl) tris (tripropylene glycol) diphosphite, bis (pentachlorophenyl) tris (tripropylene glycol) diphosphite, bis (o-chlorophenyl) tris (tripropylene glycol) diphosphite, diphenyl tris (dipropylene glycol) diphosphite, bis (o-cresyl) tris (dipropylene glycol) diphosphite, mono phenyl mono decyl tris (tripropylene glycol) diphosphite, bis decyl tris (dipropylene glycol) diphosphite, bis ($\beta$-naphthyl) tris (tripropylene glycol) diphosphite, diphenyl tris (polypropylene glycol 1025) diphosphite, di (m-cresyl) tris (polypropylene glycol 1025) diphosphite, bis (2,3,5-trichlorophenyl) tris (polypropylene glycol 1025) diphosphite, bis (dodecyl) tris (polypropylene glycol 1025) diphosphite, diphenyl tris (polypropylene glycol 2025) diphosphite, bis decyl tris (polypropylene glycol 2025) diphosphite, bis (pentachlorophenyl) tris (polypropylene glycol 2025) diphosphite, bis (pentabromophenyl) tris (polypropylene glycol 2025) diphosphite, diphenyl tris (diethylene glycol) diphosphite, diphenyl tris (triethylene glycol) diphosphite, bis (p-cresyl) tris (triethylene glycol) diphosphite, bis (n-octyl) tris (triethylene glycol) diphosphite, bis (p-chlorophenyl) tris (triethylene glycol) diphosphite, bis (2,4,6-trichlorophenyl) tris (polyethylene glycol 400 molecular weight) diphosphite, diphenyl tris (polyethylene glycol 400) diphosphite, bis (decyl) tris (polyethylene glycol 400) diphosphite, diphenyl tris (polyethylene glycol molecular weight 1000) diphosphite, bis (m-cresyl) tris (polyethylene glycol 1000) diphosphite, bis (2-ethylhexyl) tris (polyethylene glycol 1000) diphosphite, bis (2,4,6-trichlorophenyl tris (polyethylene glycol 1000) diphosphite, diphenyl tris (polyethylene glycol molecular weight 2000) diphosphite, bis (isodecyl) tris (polyethylene glycol 2000) diphosphite, diphenyl tris (polyethylene glycol 3000) diphosphite, diphenyl tris (ditetramethylene glycol) diphosphite, diphenyl tris (tri tetramethylene glycol) diphosphite, bis (pentachlorophenyl) tris (tri tetramethylene glycol) diphosphite, diphenyl tris (polytetramethylene glycol molecular weight 1000) diphosphite, bis (3,5-xylenyl) tris (polytetramethylene glycol 1000) diphosphite, bis (o-chlorophenyl) tris (polytetramethylene glycol 1000) diphosphite, diphenyl tris (tetramethylene glycol) diphosphite, diphenyl tris (hexamethylene glycol) diphosphite, diphenyl tris (decamethylene glycol) diphosphite, bis (decyl) tris (decamethylene glycol) diphosphite, bis (2,4,6-trichlorophenyl) tris (decamethylene glycol) diphosphite, bis (pentabromophenyl) tris (decamethylene glycol) diphosphite, diphenyl bis (polypropylene glycol 425) mono polypropylene glycol 1025 diphosphite.

While the diphosphite compounds prepared have for the most part Formula I, it will be appreciated that there is also formed a small amount of the isomeric compound having the formula

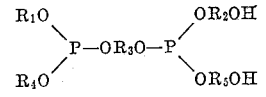

II

Where $R_1$, $R_2$, $R_3$, $R_4$, and $R_5$ are as defined above. There is no need to separate the isomers since the mixture as formed has proven effective as a color stabilizer for flexible polyurethane foams and the other uses set forth previously.

As previously indicated, the diphosphites of the present invention can be formed by reacting 2 moles of a trihydrocarbyl phosphite or a tris (haloaryl) phosphite with 3 moles of the diol and removing 4 moles of monohydric alcohol or monohydric phenol. Alternatively the reaction can be carried out by reacting two moles of a trihydrocarbyl phosphite or a tris (haloaryl) phosphite, two moles of a phenol or alcohol boiling above the phenol or alcohol derived from the trihydrocarbyl phosphite or tris (haloaryl) phosphite and 3 moles of diol and removing 6 moles of the phenol or alcohol derived from the trihydrocarbyl phosphite or tris (haloaryl) phosphite.

*Example 1*

| | Grams |
|---|---|
| Polypropylene glycol 425 (1.5 moles) | 638 |
| Triphenyl phosphite (1.0 mole) | 310 |
| 2,4,6-trichlorophenol (1.0 mole) | 198 |
| Sodium phenate (catalyst) | 10 |

This mixture was heated in a stirred flask and a total of 295 grams of distillate were removed by vacuum distillation. Terminal conditions were 160° C. and 2 mm. Hg pressure. The product in the pot was bis (2,4,6-trichlorophenyl) tris (polypropylene glycol 425) diphosphite, a light pink liquid of medium viscosity having a refractive index at 25° C. of 1.4848 and an Acid Number of 0.21. When incorporated in flexible polyurethane foam forming compositions, it imparted flame resistance and acted as a good stabilizer for the polyurethane foam which was formed.

The equation for the reaction is

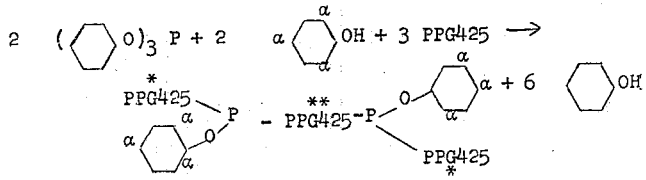

In the equation PPG 425 stands for polypropylene glycol molecular weight 425; PPG* stands for polypropylene glycol 425 with one terminal hydrogen removed; and PPG** stands for polypropylene glycol 425 with the two terminal hydrogens removed.

Example 2

|  | Grams |
|---|---|
| Polypropylene glycol 425 (12 moles) | 5100 |
| Triphenyl phosphite (8 moles) | 2480 |
| Sodium phenate (catalyst) | 20 |

The mixture was heated in a pot and vacuum distilled. Terminal conditions were 157° C. and 3 torr. There was recovered 1589 grams of distillate having a set point of 40.3° C.

The residue in the pot was stirred with 10 grams of Hi-flo filter aid and then filtered. The diphenyl tris (polypropylene glycol 425) diphosphite product obtained was a clear liquid of medium viscosity, R.I. at 25° C. was 1.4742, Acid No. 0.0; Hydroxy Number (determined by phenylisocyanate method) 60. The product was a good color stabilizer for flexible polyurethane foams and was superior to additive type stabilizers such as bis decyl pentaerythritol diphosphite and diphenyl pentaerythritol diphosphite.

The equation for the reaction in Example 2 is

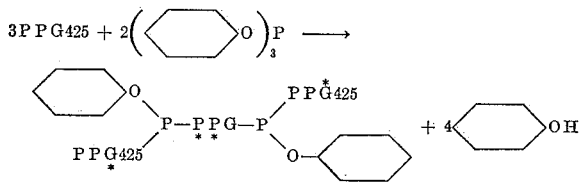

Example 3

The procedure of Example 2 was repeated replacing the triphenyl phosphite by 8 moles of tris decyl phosphite to produce bis (decyl) tris (polypropylene glycol 425) phosphite.

Example 4

The procedure of Example 2 was repeated using as the reactants 3 moles of tripropylene glycol and 2 moles of triphenyl phosphite to produce diphenyl tris (tripropylene glycol) diphosphite.

Example 5

The procedure of Example 2 was repeated using as the reactants 3 moles of dipropylene glycol and 2 moles of tris (m-p cresyl) phosphite to produce bis (m-p-cresyl) tris (dipropylene glycol) diphosphite. The compound tris (m-p cresyl) phosphite is the compound prepared by reacting PCl₃ with 3 moles of the commercial mixture of meta and para cresol.

Example 6

The procedure of Example 2 was repeated using as the reactants 3 moles of polyethylene glycol 1000 and 2 moles of triphenyl phosphite to produce diphenyl tris (polyethylene glycol 1000) diphosphite.

Example 7

The procedure of Example 2 was repeated using as the reactants 3 moles of polypropylene glycol 1025 and 2 moles of triphenyl phosphite to produce diphenyl tris (polypropylene glycol 1025) diphosphite.

Example 8

The procedure of Example 2 was repeated using as the reactants 2 moles of triphenyl phosphite and 3 moles of polypropylene glycol 2025 to produce diphenyl tris (polypropylene glycol 2025) diphosphite.

Example 9

The procedure of Example 1 was repeated using as the reactants 1.5 moles of polypropylene glycol molecular weight 450 and 1.0 mole of triphenyl phosphite and 1.0 mole of pentabromophenol to produce bis (pentabromophenyl) tris (polypropylene glycol 450) diphosphite.

As has been set forth previously, the diphosphites of the present invention are especially useful in preparing flame resistant, color stabilized polyurethanes and in particular flame resistant, color stabilized, flexible polyurethane foams.

The diphosphites can be the sole hydroxyl reactant present, e.g., 1 mole of diphenyl tris (polypropylene glycol 425) diphosphite can be reacted with 1.05 moles of toluene diisocyanate in the presence of a small amount of water to give a flexible, flame resistant polyurethane foam, or, more preferably, they can be used in admixture with other polyhydroxy compounds (polyols) in forming the polyurethanes. Foamed polyurethanes can be obtained, as indicated, by adding water prior to or simultaneously with the addition of the polyisocyanate.

Alternatively, foams can be prepared by uniformly distributing a liquefied halogen substituted alkane containing at least one fluorine atom in its molecule and having a boiling point at one atmosphere pressure not higher than 80° F. and preferably not lower than −60° F. in either the phosphite (or mixture of phosphite and other polyhydroxy compound) reactant or the polyisocyanate reactant and then mixing the reactants and permitting the temperature of the mixture to rise during the ensuing reaction above the boiling point of the liquefied gas to produce a porous polyurethane. Such fluorine containing compounds include dichlorodifluoromethane, dichloromonofluoromethane, chlorodifluoromethane, and dichlorotetrafluoroethane. The foams can be formed with such fluorine containing compounds in the manner described in General Tire British Patent 821,342.

Foamed polyurethanes can be made by either the one shot or two step procedures. In the case of the reaction of phosphites having a hydroxyl number above 125 in order to form a good flexible foam it is often desirable to employ the two step procedure unless an additional polyhydroxy reactant is added to lower the hydroxyl number of the hydroxy reactants to below 125 and preferably below 100, e.g., as low as 25, but preferably at least 35.

In preparing urethane foams according to the invention a rigid foam is made utilizing a polyol phosphite of the type set forth supra (or mixture of such phosphite and another polyhydroxy containing compound) having a hydroxyl number of 350–750; a semi-rigid foam is prepared if the hydroxyl number is 75–350, and a flexible foam is prepared if the hydroxyl number is 35–75.

The polyurethanes prepared according to the present invention are solids. They have good flame-proofing properties and in the foamed form are useful as linings for textiles, e.g., coats, suits and dresses, insulation in building construction, upholstery filling material, pillows, hair curlers, brushes, carpet underlays or backings, shock absorbent filling for packages, shoes, etc.

The unfoamed polyurethane products are useful wherever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass and as adhesives.

As examples of organic polyisocyanates which can be used to make the polyurethanes there can be employed toluene-2,4-diisocyanate; toluene-2,6-diisocyanate; 4-methoxy-1,3-phenylene diisocyanate; diphenyl methane-4,4′-diisocyanate; 4-chloro-1,3-phenylene diisocyanate; 4-isopropyl-1,3-phenylene diisocyanate; 2,4-diisocyanato-diphenylether; 3,3′ - dimethyl - 4,4′ - diisocyanatodiphenyl methane; mesitylene diisocyanate; durylene diisocyanate; 4,4′-methylene bis (phenylisocyanate); benzidine diisocyanate; 4,4′-diisocyanato dibenzyl; 3,3′-bitolylene-4,4′-diisocyanate; 1,5-naphthylene diisocyanate; tetramethylene diisocyanate; hexamethylene diisocyanate; decamethylene diisocyanate; toluene-2,4,6-triisocyanate; tritolylmethane triisocyanate, 2,4,4'-triisocyanatodiphenyl ether; phenylene diisocyanate; o-, m- and p-xylene diisocyanates; the reaction product of toluene diisocyanate with trimethylolpropane at an NCO/OH ratio of 2:1, (Mondur CB); the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyolphosphite is dipropylene glycol tetrol diphosphite or tris (dipropylene glycol phosphite or 2,4,6-trichlorophenyl bis (dipropylene glycol) phosphite; as well as polyisocyanates listed in Siefken (Annalen vol. 562, pages 122–135, 1949).

There can also be used polymethylene polyphenylisocyanate molecular weight 380 to 400, having an isocyanate equivalent of 135 (maximum), a viscosity of 400 centipoises (maximum) at 25° C., a NCO content of 31% (minimum), an acid value (p.p.m. of H+) of 200 (maximum). This material is sold commercially under the trademark PAPI. There can also be used bitolylene diisocyanate (TODI) and dianisidine diisocyanate (DADI).

PAPI is particularly useful in forming rigid polyurethane foams as is toluene diisocyanate.

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20%, 2,6-isomer of toluene diisocyanate was employed in making the prepolymer. Thus, there can be used the prepolymers from toluene diisocyanate and castor oil, toluene diisocyanate and blown tung oil (or blown linseed oil or blown soya oil), toluene diisocyanate and the polyester of ethylene glycol, propylene glycol and adipic acid having a molecular weight of 1900 described in Example I of Kohrn Patent 2,953,839, as well as the isocyanate terminated prepolymers in Examples II–VIII, inclusive, of the Kohrn patent, toluene diisocyanate and polytetramethylene glycol (1000 molecular weight), toluene diisocyanate and polypropylene glycol (molecular weight 2025), toluene diisocyanate and dipropylene glycol, toluene diisocyanate and polypropylene glycol (molecular weight 1025), toluene diisocyanate and LG–56 (glycerine-propylene oxide adduct having a molecular weight of 3000), toluene diisocyanate and 1,2,6-hexanetriol-propylene oxide adducts having molecular weights of 500, 700, 1500, 2500, 3000 and 4000, hexamethylene diisocyanate and pentaerythritol, toluene diisocyanate and polyethylene sebacate, toluene diisocyanate and a mixture of 98% polypropylene glycol (molecular weight 1900) with 2% 1,2,6-hexanetriol, toluene diisocyanate and a copolymer of ethylene oxide and propylene oxide having a molecular weight of 2020, toluene diisocyanate and glyceryl adipate phthalate polymer, toluene diisocyanate and a mixture of polypropylene ether glycol molecular weight 995 and castor oil as described in Example 2 of Kane Patent 2,955,091, as well as the other prepolymers set forth in Examples 1 and 3–11 of Kane, toluene diisocyanate and polypropylene ether glycol (molecular weight 1800) of Example I of Swart Patent 2,915,496 and the prepolymers of Examples II, III, VI and VIII of the Swart patent. Toluene diisocyanate and tris (dipropylene glycol) phosphite; toluene diisocyanate and tris (polypropylene glycol 2025) phosphite.

As previously stated, the diphosphites of the present invention can be the sole hydroxyl reactant present or they can be used in admixture with other polyhydroxy compounds in forming the polyurethanes. Examples of such compounds are polyethylene glycols having molecular weights of 400 to 3000; polypropylene glycols having molecular weights of 400 to 3000; ethylene glycol; diethylene glycol; triethylene glycol; propylene glycol; dipropylene glycol; tripropylene glycol; thiodiglycol; glycerol; trimethylolethane; trimethylolpropane; ether triols from glycerine and propylene oxide having molecular weights of 1000 and 3000, ether containing triols from 1,2,6-hexane triol and propylene oxide having molecular weights of 750, 1500, 2400 and 4000; sorbitol-propylene oxide adduct molecular weight 1000; pentaerythritol-propylene oxide adduct molecular weight 1000; trimethylolphenol; octakis (2-hydroxypropyl) sucrose, pentaerythritol; castor oil; blown linseed oil; blown soya oil; N,N,N',N'-tetrakis (2-hydroxypropylene) ethylene diamine; mixed ethylene glycol-propylene glycol adipate resin molecular weight 1900; polyneopentylene sebacate; reaction product of 1 mole of trimethylolpropane with 3000 to 12000 molecular weight units of 1,4-butanediol adipic acid polyester; oxypropylated p-tert. butylphenol-formaldehyde resin of example 2b of DeGroote United States Patent 2,499,365; tris (dipropylene glycol) phosphite; tris (polypropylene glycol 2025) phosphite; dipropylene glycol tetrol diphosphite; dipropylene glycol hydroxypropoxypropane phosphonate; penta hydroxyethyl dextrose; bis polypropylene glycol 2025 ester of hydroxypolypropoxypropane phosphonic acid (wherein the hydroxy polypropoxypropane group has a molecular weight of about 2025); bis diethylene glycol ester of hydroxyethoxyethane phosphonic acid, bis tripropylene glycol ester of butanephosphonic acid.

As indicated, the diphosphites can be used in an amount as little as 0.5% of the total reactants. Usually from 5 to 100% of the hydroxyl component is the diphosphite of the invention.

The diphosphites are especially useful as stated as light and color stabilizers for polyurethane resins, particularly such resins made from any of the non phosphite containing polyols set forth above. Such non phosphite containing polyols usually consist of carbon, hydrogen and oxygen and the hydroxyl groups are normally the only reactive groups present. For such use the diphosphites are usually employed in an amount of from 0.1–20% by weight of the polyol, e.g., 2.5% by weight of diphenyl tris (polypropylene glycol 425) diphosphite is added to 14.4 grams of LG–56 (glycerine-propylene oxide adduct molecular weight 3000) and there is added 5.2 grams of toluene diisocyanate and 0.37 gram of water to form a light and color stable flexible foamed polyurethane.

In preparing the cured and/or foamed polyurethanes any of the conventional catalysts can be employed, e.g., sodium hydroxide, sodium methylate, sodium phenolate, tertiary amines, e.g., N-methyl morpholine, N-ethyl morpholine, 1,2,4-trimethylpiperazine, trimethyl amine, triethyl amine, tributyl amine and other trialkyl amines. The esterification product of 1 mole of adipic acid and 2 moles of diethyl ethanolamine, triethyl amine citrate, 3-morpholino-propionamide, 2 - diethylaminoacetamide, triethylene diamine, N,N,N',N'-tetrakis (2-hydroxypropyl) ethylene diamine, tribenzyl amine, N,N'-dimethylpiperazine, N,N-dimethyl hexahydroaniline, 2,2,1-diazabicyclooctane, 1,2-dimethylimidazole, arsenic trichloride, antimony pentachloride, titanium tetrachloride, dioctyl lead diacetate, octylene glycol titanate. There can also be used tin compounds having at least one direct carbon to tin valence bond, e.g., hydrocarbon tin acylates such as dibutyltin dilaurate, dibutyltin dioctoate, tributyltin monolaurate, dimethyltin diacetate, dibutyltin maleate, hydrocarbon tin alkoxides, e.g., dibutyltin diethoxide and dibutyltin dimethoxide, octyl stannoic acid, trimethyltin hydroxide, trimethyltin chloride, triphenyltin hydride, triallyltin chloride, tributyltin flouride, dibutyltin dibromide, bis (carboethoxymethyl) tin diiodide, tributyltin chloride, trioctyltin acetate, butyltin trichloride, octyltin tris (thiobutoxide), dimethyltin oxide, stannous octanoate, dioctyltin oxide, diphenyltin oxide, stannous oleate as well as the other tin compounds set forth in Hostettler French Patent 1,212,252 and Barnes United States Patent 3,022,256.

There can also be used a small amount, e.g., 0.001 to 10% by weight of the total ingredients of a stabilizing or thickening agent, e.g., methoxylated cellulose, ethyl cellulose, hydroxyethyl cellulose, benzyl cellulose, cellulose acetate, cellulose, acetate-butyrate, hydroxyethyl polyvinyl alcohol, polyvinyl chloride, polymerized methyl methacrylate.

Fillers can be added in amounts up to 20% by weight, e.g., clay, diatomaceous earth, powdered aluminum and baryllium, vermiculite, cork, bark, foamed polystyrene, foamed polyethylene and foamed polypropylene can be used.

Conventional surfactants can be added in an amount of 0.1–5% by weight of the composition. Preferably less than 1%, e.g., 0.2% of surfactant is employed. The preferred surfactants are silicones, e.g., polydimethyl siloxane having a viscosity of 3 to 1000 centistokes, trimethoxydimethyl polysiloxane molecular weight 850 copolymerized with a dimethoxy-polyethylene glycol of molecular weight 750 as well as any of the other siloxanes disclosed in Hostettler French Patent 1,212,252 and the soloxane-oxyalkylene copolymers having from about 10 to 80% by weight of soloxane polymer and from 90 to 20% by weight of alkylene oxide polymer such as the copolymers described in United States Patent 2,834,748.

Unless otherwise indicated, all parts and percentages are by weight.

In the following examples, unless otherwise indicated, when toluene diisocyanate was employed it was a mixture of 80% of the 2,4-isomer and 20% of the 2,6-isomer.

In preparing one shot foams in the examples there was utilized the following standard formulation:

|  | Gram |
|---|---|
| Water | 0.37 |
| Dibutyltin dilaurate | 0.07 |
| Polydimethyl siloxane (50 centistokes grade) | 0.12 |
| N-ethyl morpholine | 0.1 |
| Polyol, as indicated. | |

This mixture is designated in the examples as Formulation A.

Foams were made by adding Formulation A to 5.2 grams of the toluene diisocyanate. The foams were then cured in a 110° C. oven for about 20 minutes.

Example 10

The polyol used in Formulation A was 13.3 grams of diphenyl tris (polypropylene glycol 425) diphosphite. Upon addition of 5.2 grams of toluene diisocyanate there was produced a solid flexible foam which was non burning and color stable.

Example 11

The polyol used in Formulation A was a mixture of 0.7 gram of diphenyl tris (polypropylene glycol 425) diphosphite and 13.7 grams of LG–56 (glycerine propylene oxide adduct molecular weight 3000). Upon addition of 5.2 grams of toluene diisocyanate there was produced a solid, flexible foam having better color stability than a similar foam from which the diphosphite was omitted.

Example 12

The polyol used in Formulation A was a mixture of 1.4 grams of bis (2,4,6-trichlorophenyl) tris (polypropylene glycol) diphosphite and 12.9 grams of LG–56. Upon addition of 5.2 grams of toluene diisocyanate there was produced a flexible foam having better color stability than a similar foam from which the diphosphite was omitted.

Example 13

The polyol used in Formulation A was a mixture of 2.1 grams of diphenyl tris (polypropylene glycol 425) diphosphite and 12.1 grams of polypropylene glycol molecular weight 2025. Upon addition of 5.2 grams of toluene diisocyanate there was produced a flexible foam having better color stability than a similar foam from which the diphosphite was omitted.

Example 14

The polyol used in Formulation A was a mixture of 2 grams of bis (decyl) tris (decyl) tris (polypropylene glycol) diphosphite and 12.5 grams of LG–56. Upon addition of 5.2 grams of toluene diisocyanate there was produced a flexible foam having good color stability.

Example 15

The polyol used in Formulation A was a mixture of 1.3 grams of diphenyl tris (tripropylene glycol) diphosphite and 11.4 grams of polypropylene glycol 2025. Upon the addition of 5.2 grams of toluene diisocyanate there was produced a flexible foam having good color stability.

What is claimed is:

1. Diphosphites having the formula

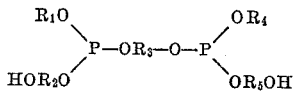

where $R_1$ and $R_4$ are selected from the group consisting of alkyl, phenyl, alkyl phenyl, naphthyl, chlorophenyl and bromo phenyl and $R_2$, $R_3$ and $R_5$ are selected from the group consisting of alkylene, alkyleneoxyalkylene and alkylene poly (oxyalkylene).

2. Bis (carbocyclic aryl phenyl or alkyl phenyl) tris (polyalkylene glycol) diphosphites.

3. Bis (carbocyclic aryl phenyl or alkyl phenyl) tris (polypropylene glycol) diphosphites.

4. Diphosphites according to claim 3 wherein the polypropylene glycol has a molecular weight of about 200 to about 1025.

5. Diphenyl tris (polypropylene glycol) diphosphites.

6. Diphenyl tris (polypropylene glycol) diphosphites wherein the polypropylene glycol has a molecular weight of about 200 to about 1025.

7. Diphenyl tris (tripropylene glycol) diphosphite.

8. Diphenyl tris (polypropylene glycol 425) diphosphite.

9. Bis (halophenyl) tris (polypropylene glycol) diphosphites wherein the halogen atoms have an atomic weight of 35 to 80.

10. Diphosphites according to claim 9 wherein each halophenyl group has 3 to 5 halogen atoms.

11. Bis (alkyl) tris (polypropylene glycol) diphosphites.

12. Diphosphites according to claim 11 wherein each alkyl group has 8 to 12 carbon atoms.

No references cited.

CHARLES B. PARKER, *Primary Examiner.*

A. H. SUTTO, *Assistant Examiner.*